United States Patent [19]

Sogabe et al.

[11] Patent Number: 4,955,128

[45] Date of Patent: Sep. 11, 1990

[54] METHOD FOR INSERTING ROTOR OF ELECTRIC MOTOR

[75] Inventors: Masatoyo Sogabe; Kazushi Kumagai, both of Yamanashi, Japan

[73] Assignee: Fanuc Ltd., Yamanashi, Japan

[21] Appl. No.: 265,866

[22] PCT Filed: Feb. 4, 1988

[86] PCT No.: PCT/JP88/00100

§ 371 Date: Oct. 3, 1988

§ 102(e) Date: Oct. 3, 1988

[87] PCT Pub. No.: WO88/06373

PCT Pub. Date: Aug. 25, 1988

[30] Foreign Application Priority Data

Feb. 17, 1987 [JP] Japan ................................. 62-032479

[51] Int. Cl.⁵ ............................................. H02K 15/16
[52] U.S. Cl. ........................................ 29/596; 29/598; 29/732; 310/42; 310/89
[58] Field of Search ............... 29/596, 598, 732, 736; 310/89, 90, 91, 42

[56] References Cited

U.S. PATENT DOCUMENTS

| | | | |
|---|---|---|---|
| 2,814,096 | 11/1957 | Herbrecht | 29/732 |
| 3,075,250 | 1/1963 | Strohm et al. | 29/596 |
| 3,156,076 | 11/1964 | Origoni et al. | 29/596 X |
| 3,717,779 | 2/1970 | Hallerback | 310/91 |
| 4,015,154 | 3/1977 | Tanaka et al. | 310/42 |
| 4,748,739 | 6/1988 | Muradliyan | 29/732 |

Primary Examiner—Carl E. Hall
Attorney, Agent, or Firm—Armstrong, Nikaido Marmelstein, Kubovcik & Murray

[57] ABSTRACT

A method for inserting a rotor including the step of centering and guiding a first end portion of the rotor by a first guide tool having an inclined face which is in turn attached to the first end portion of the stator cooperating with a second guide tool attached to a rear end portion of the rotor shaft during initial insertion of the rotor into the stator. The rotor has a magnet which is easily chipped and is arranged on a peripheral face of the rotor. The method further includes the step of guiding a second end portion of the rotor within the stator by guiding a front end portion of a rotor shaft by a front bearing attached to the second end portion of the stator, and by guiding a rear end portion of the rotor shaft by the first guide tool attached to the first end portion of the stator cooperating with the second guide tool attached to a rear end portion of the rotor shaft. The method further includes the step of removing the first and second guide tools from the first end portion of the stator and the rear end portion of the rotor shaft, respectively.

2 Claims, 10 Drawing Sheets

METHOD FOR INSERTING ROTOR OF ELECTRIC MOTOR

TECHNICAL FIELD

The present invention relates to a method for inserting a rotor in the process of manufacturing an electric motor, and further, to an electric motor having a structure in which the insertion of a rotor is facilitated, and the present invention is used in the field of an electric motor of the type in which a magnet easily chipped, such as a ferrite magnet, an alnico magnet or a samarium-cobalt magnet, is arranged and fixed on the peripheral face of a rotor.

BACKGROUND ART

As the conventional electric motor to which the present invention is directed, there can be mentioned an electric motor as shown in FIGS. 5A and 5B. More specifically, many cut grooves 2 are formed at constant intervals on the inner circumferential face of a stator 1 having an inner face of a cylindrical shape, which is formed of a laminated iron core of an electromagnetic steel sheet, a winding 3 being inserted in the grooves and a front bracket 5 and a rear bracket 14 being fixed to the stator 1 by bolts 12. Each bracket protects the end portions (coil ends) of the winding projecting frontward and backward from the stator and supports each of the bearings 10 and 11 of a shaft 8 of a rotor proper 6 formed of a permeable material and having a magnet plate 7 arranged on and fixed to the peripheral face thereof.

As shown in FIGS. 6A and 6B, the assembly of the rotor in this electric motor is performed by fitting and fixing the front bearing 10 and rear bearing 11 to the front and rear parts of the shaft 8 of the rotor proper 6 having a magnet arranged on and fixed to the peripheral face thereof, inserting the rotor into the stator while taking care that the magnet 7 on the peripheral face of the rotor does not impinge against the inner circumferential face of the stator 1, fitting the front bearing 10 into the recess $R_1$ of the front bracket 5 as shown in FIG. 5A, engaging the recess $R_1$ of the rear bracket 14 with the rear bearing 11, and securing both brackets 5 and 14 by bolts 12.

Most magnets used at present for industrial purposes are formed of materials which are easily chipped, and therefore, at the step of inserting a rotor in the manufacture of a conventional electric motor as shown in FIGS. 5A and 5B, if there is even a slight deviation $\Delta$ between the axis X—X of the stator and the axis $X_1$—$X_1$ of the rotor, as shown in FIG. 6A, since the difference between the outer diameter $d_3$ of the rotor and the inner diameter D of the stator is small, at the point $P_1$ shown in the drawings, the lower end E of the outer face of the rotor impinges against the upper end $T_1$ of the inner face of the stator and the lower end E of the magnet is chipped.

Furthermore, as shown in FIG. 6B, if the rotor is inserted in the state where the axis $X_1$—$X_1$ of the rotor is slightly inclined to the axis X—X, the lower end E of the outer face of the magnet impinges against the inner face of the stator, which is a coarse face of the laminate of the electromagnetic steel sheet, at the point $P_2$ in the drawings, and at the point $P_{2=}$ the upper end $T_1$ of the inner face of the stator impinges against the surface of the magnet, with the result that the magnet is damaged at the two points $P_2$ and $P_{2=}$. Where the magnet has already been magnetized, the rotor is assembled in the state where most of the chipped magnet pieces are attracted to the surface of the rotor or the inner face of the stator by the magnetic force.

Where the rotor is built in an electric motor together with these magnet pieces, problems such as non-rotation of the rotor and hitching during the rotation are caused.

Where the magnet on the peripheral face of the rotor already has an attracting force as the permanent magnet at the assembling step, the magnet is apt to adhere to the inner face of the stator during the insertion, and since the inner face of the stator is coarse, there is a risk of damaging the magnet only by attraction by the magnetic force.

The present invention provides a method for improving the assembling method which involves the above-mentioned difficulties and in which the efficiency is low and defective products are often formed, and further, provides an electric motor having a structure to which the improved assembling method is easily applied.

DISCLOSURE OF THE INVENTION

According to the first invention of this application, for example as shown in FIG. 2, a bearing holder 9 having an outer diameter $d_2$ is fitted to a rear bearing 11 fixed to a shaft of a rotor having an outer diameter $d_3$, on the peripheral face of which a magnet is arranged and fixed, to form a rotor assembly, a rear bracket 4 having an inner circumferential face including an inclined guide face F having a length $l_1$ from the end and an inner diameter $D_1$ and a cylindrical guide face having an inner diameter $D_2$ is arranged on the rear portion of the stator 1 having an inner diameter D, the top end E of the outer face of the rotor is guided by the inclined face F of the rear bracket 4 under the relation of $D > D_2 \geq d_2 \geq d_3$, the rotor is inserted in the stator while centering the rotor, the front end of the shaft is then inserted in a front bearing 10 fixed to the front bracket, and the rotor assembly is inserted in the stator while the bearing holder 9 of the rear bearing is caused to slide as a guide member.

The difference between the outer diameter $d_3$ and the inner diameter $D_2$ of the cylindrical portion of the rear bracket is very small, and the guide face of the rear bracket appropriately guides the surface of a rotor magnet. After the front end of the shaft has been fitted into the front bearing, the rotor can be inserted in the centered state where the rotor is supported at two points by the front bearing 10 and the rear bracket 4 as the guide member.

The second invention of this application relates to an electric motor in which the first invention is suitably carried out. As shown in FIGS. 1A and 1B, a front bracket 5 having a bearing-supporting recess $R_1$ at the center and a rear bracket 4 having an inner circumferential face including an inclined face F having an expanded end and a cylindrical face having an inner diameter $D_2$ are fitted on a stator 1 having an inner diameter D and having a winding 3 arranged in each cut groove 2 from both sides of the stator 1 and are secured in this state by bolts 12. A rotor having a magnet 7 arranged and secured on the peripheral face is supported by a front bearing 10 fitted into the supporting recess $R_1$ of the front bracket and a rear bearing 11 fitted in the supporting recess $R_1$ of a bearing holder 9 fixed as the guide member to the inner circumferential face of the rear bracket 4.

The bearing holder 9 of the guide member sliding for inserting the rotor while supporting the rear bearing 11 is fixed to the rear bracket 4 while inserted in the rear bracket, and the integrated members 4 and 9 cap and protect the coil end of the wiring 3 similar to the conventional rear bracket 14, and simultaneously, support the bearing 11. Accordingly, the risk of damaging a magnet, as observed in the conventional technique, can be eliminated at the assembling step.

Therefore, in the invention of this application, at the point of initiation of the insertion of the rotor, a magnet on the peripheral face of the rotor, which is easily chipped, is guided and slid by the inclined guide face of the guide member, and thus the rotor is slid into the stator without impingement of the end portion E of the rotor against the stator, which occurs at the point of initiation of the insertion in the conventional technique (FIG. 6A). Furthermore, since the inner diameter $D_2$ of the cylindrical guide face of the guide member is smaller than the inner diameter D of the stator, the rotor is guided in the state where the magnet face on the periphery of the rotor is not brought into contact with the inner face of the stator, and the front part of the shaft is centered and guided. Therefore, midway in the insertion of the rotor, the impingement caused in the conventional technique as shown in FIG. 6B does not occur.

Moreover, since guide members 4 and 40 are formed of a non-magnetic material such as stainless steel, the magnet does not attract the guide members at the insertion of the rotor, and thus the rotor can be slid in the centered state smoothly and an electric motor can be manufactured at a high efficiency.

If tools having a high dimensional precision are used as guide members for which a high precision is required, an electric motor can be manufactured at a low cost.

BRIEF DESCRIPTION OF THE DRAWINGS

FIGS. 4A and 4B are diagrams illustrating the second embodiment of the present invention, in which FIG. 4A illustrates the state where a rotor is inserted by using tools and FIG. 4B shows the state where the tools are taken out and the rotor is fixed;

BEST MODE OF CARRYING OUT THE INVENTION

Embodiment 1

Figure 1A:
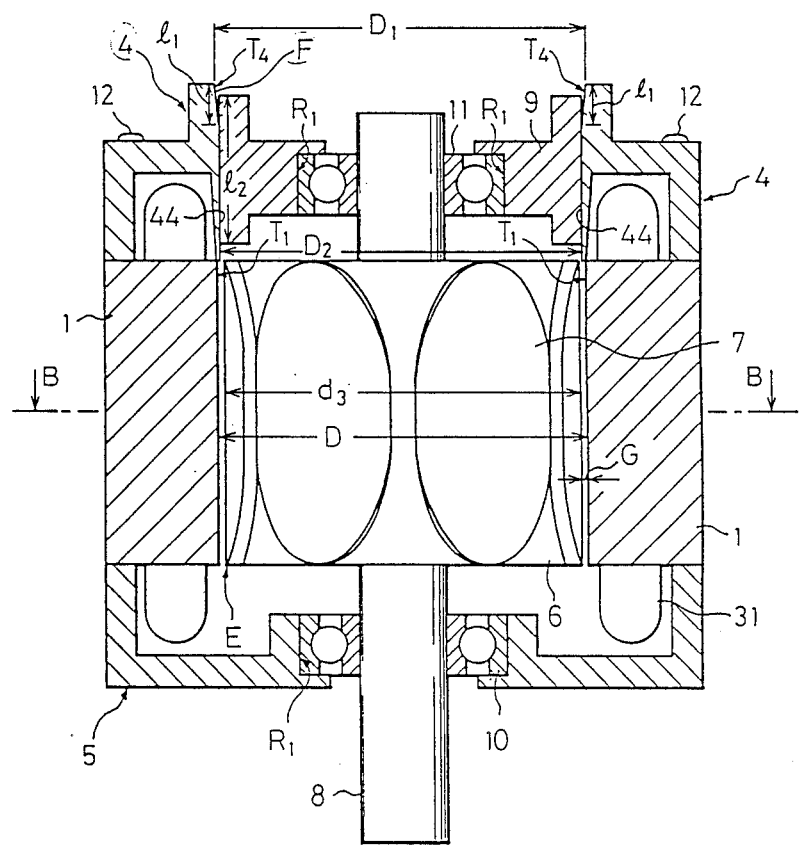
FIG. 1A is a partially longitudinally sectional side view showing a main portion of an electric motor to which the first embodiment of the present invention is applied.
Figure 1B:
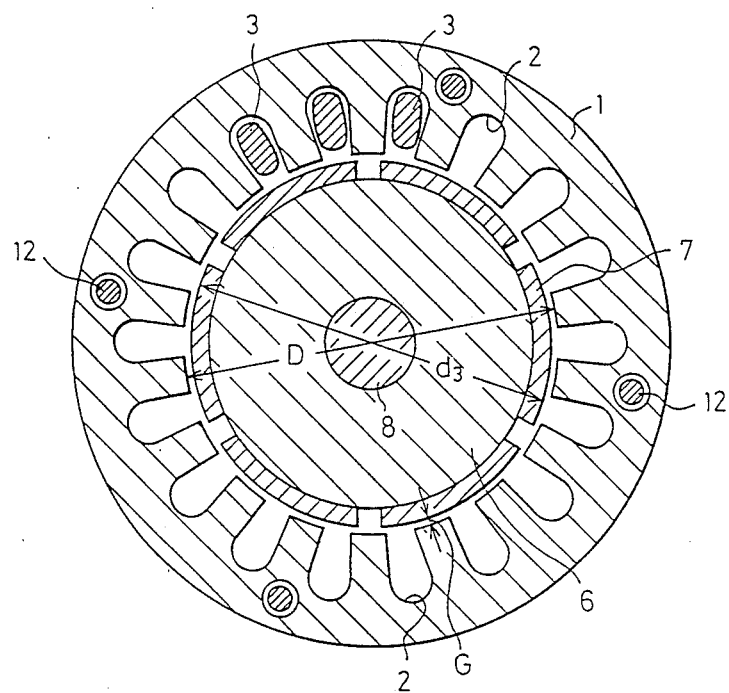
FIG. 1B is a view showing the section taken along the line B—B in FIG. 1A.

FIG. 1A is a partially longitudinally sectional view showing a main portion of an electric motor suitable for carrying out the method of the present invention, and FIG. 1B is a view showing the cross-section, taken along the line B—B in FIG. 1A, of the electric motor.

As shown in FIGS. 1A and 1B, a stator 1 comprised a laminated iron core of an electromagnetic steel sheet, and cut grooves 2 were arranged at certain intervals on the inner circumferential face and a winding 3 is inserted in each cut groove 2.

A front bracket 5 having a front bearing 10 fitted and fixed to a bearing-supporting recess $R_1$ and a rear bracket 4 of a non-magnetic material having an expanded inclined guide face F and a cylindrical guide face 44 having an inner diameter $D_2$ are fitted to the front and rear parts of the stator 1, respectively, to cover a coil end of the winding. The three members 1, 4 and 5 were integrally secured by four bolts 12.

A rotor having an outer diameter $d_3$ was constructed by arranging and fixing a plurality of magnet plates 7 at constant intervals on the peripheral face of a rotor core 6, and a rear bearing 11 is pressed and fixed into a shaft of the rotor.

Dimensions of the stator portion and rotor portion are adjusted so that the rotor could be easily passed through the top end portion, having an inner diameter $D_1$, of the inclined guide face F of the rear bracket 4, and the inner diameter $D_2$ of the cylindrical guide face 44 is adjusted so that the rotor having an outer diameter $d_3$ could be easily guided and slid.

Figure 2:
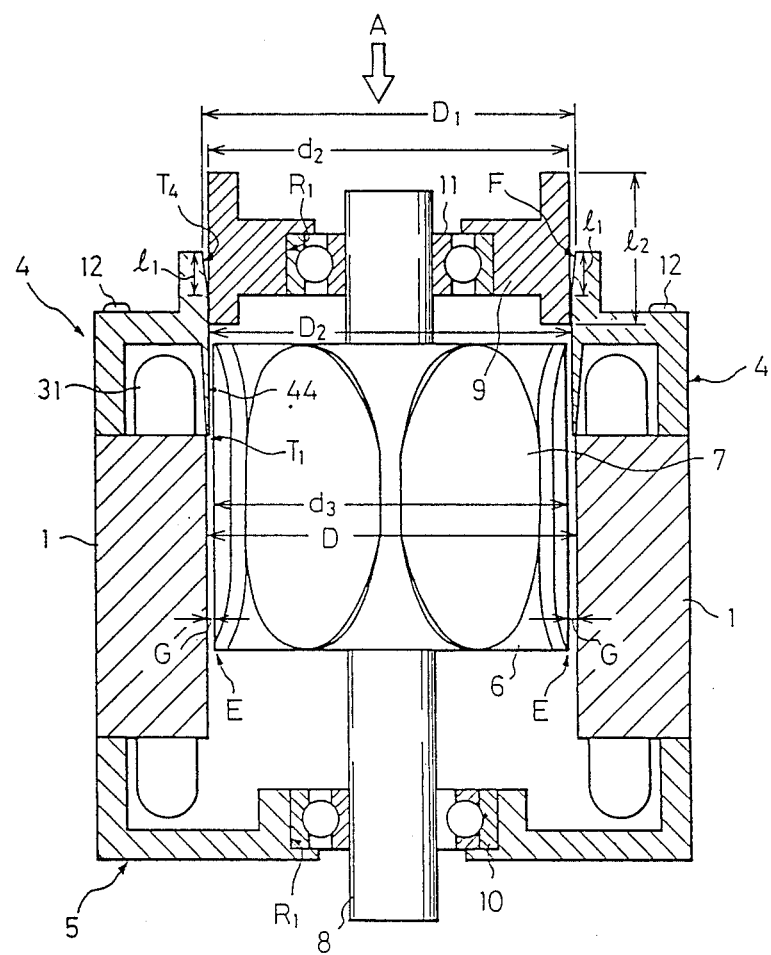
FIG. 2 is a view showing the state of the insertion of a rotor in the first embodiment of the present invention.

A bearing holder 9 having a bearing-supporting recess $R_1$ at the center and having an outer diameter $d_2$ which is substantially equal to the inner diameter $D_2$ of the cylindrical guide face 44 of the rear bracket 4 is fitted to the rear bearing 11 and an adhesive was coated on the peripheral face of the holder 9. Then, as shown in FIG. 2, the rotor was inserted in the stator while guiding the peripheral face in the direction of arrow A by the inner circumferential face of the rear bracket 4. The lower end E of the outer surface of the rotor is first centered, guided and slid by the expanded inclined guide face F of the rear bracket and since the rear bracket as the guide member is composed of a non-magnetic material, a magnet 7 can be smoothly slid without being attracted to the inclined guide face F and cylindrical guide face and the rotor can be substantially inserted in the centered state. After the front end of the shaft has arrived at the front bearing 10, the rotor can be inserted while maintaining the centered state by the front bearing 10 and the cylindrical guide face. After the bearing holder 9 had been slid on the inclined guide face F of the rear bracket 4, the rotor could be inserted while maintaining the centered state completely by the bearing holder 9 and front bearing 10 sliding as guide members.

After the rotor has been inserted to a predetermined position, that is, the position shown in FIG. 1, the bearing holder 9 is fixed to the inner face of the rear bracket by the adhesive coated in advance, thereby constructing an electric motor.

Since the rear bracket 4 and rear bearing holder 9 act as the guide members in the present electric motor, the rotor can be precisely and easily inserted without impingement of the magnet on the peripheral face of the rotor against the inner face of the stator, and therefore, the electric motor can be easily constructed at a high efficiency.

Figure 3A:
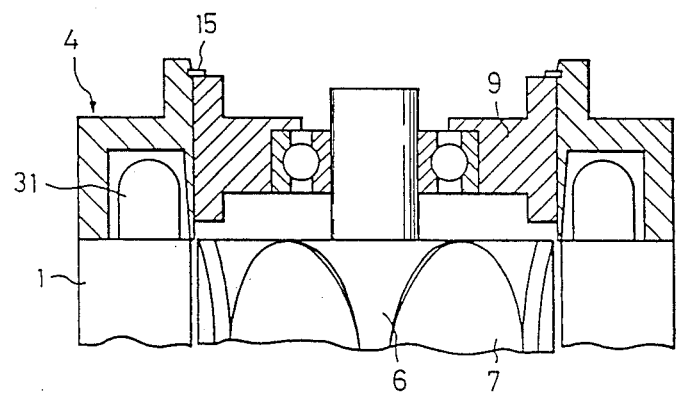
FIGS. 3A and 3B are diagrams showing modifications of the bearing holder-fixings means in the first embodiment of the present invention.
Figure 3B:
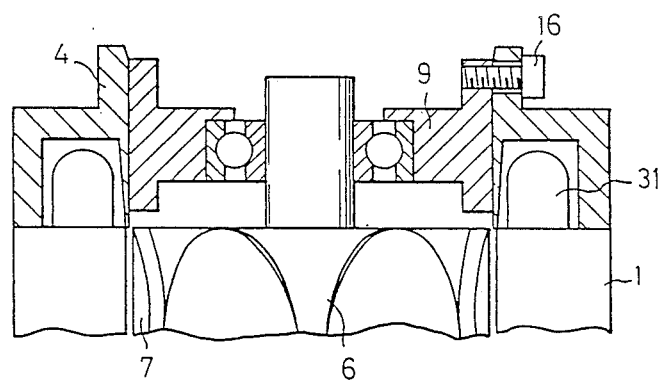

Note, in the present embodiment, when a method in which a C-shaped stop ring (C-ring) 15 is fitted in a cut groove on the inner circumference of the bracket 4 as shown in FIG. 3A or a method in which the bearing holder 9 and rear bracket 4 are secured by bolts 16 as shown in FIG. 3B is adopted as the means for fixing the bearing holder 9 to the rear bracket 4, the above-mentioned effect can be similarly attained. Moreover, when the front bearing is secured to the shaft in advance and the front bearing is guided and fitted in the bearing-supporting recess of the front bracket, the above-mentioned effect can be similarly attained.

Embodiment 2

Figure 4A:
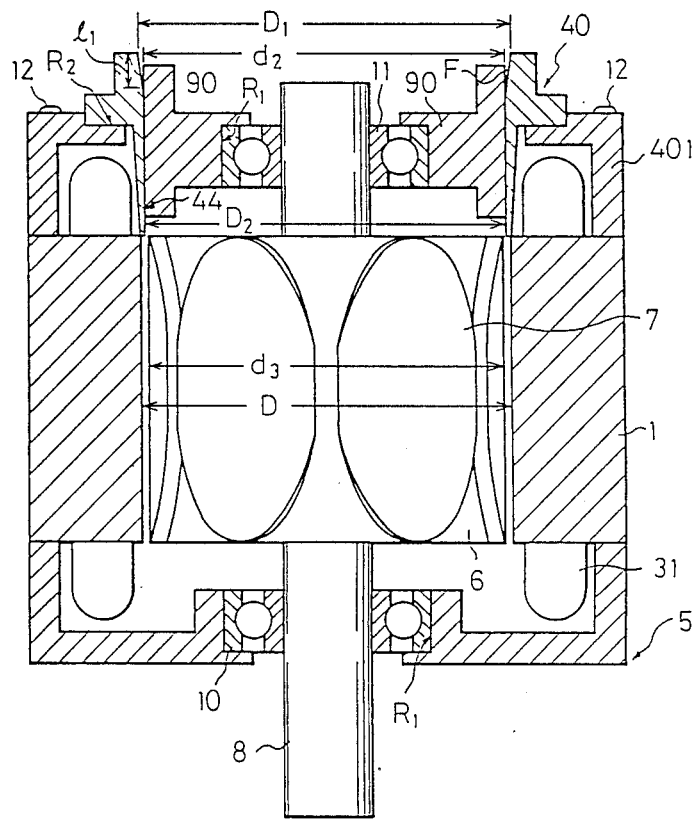
Figure 4B:
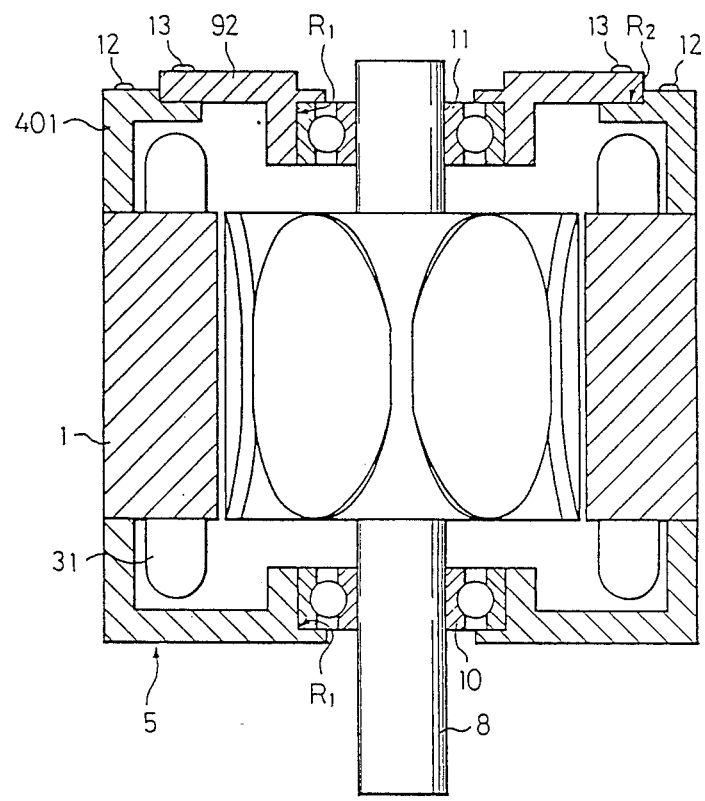
Figure 5A:
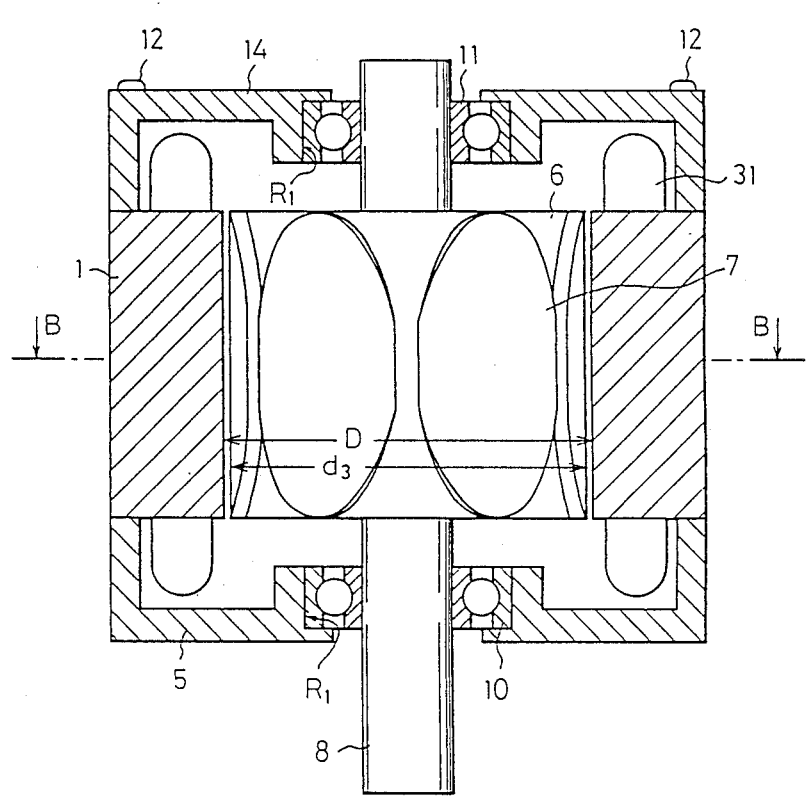
FIG. 5A is a partially longitudinally sectional side view illustrating a main portion of a conventional electric motor.
Figure 5B:
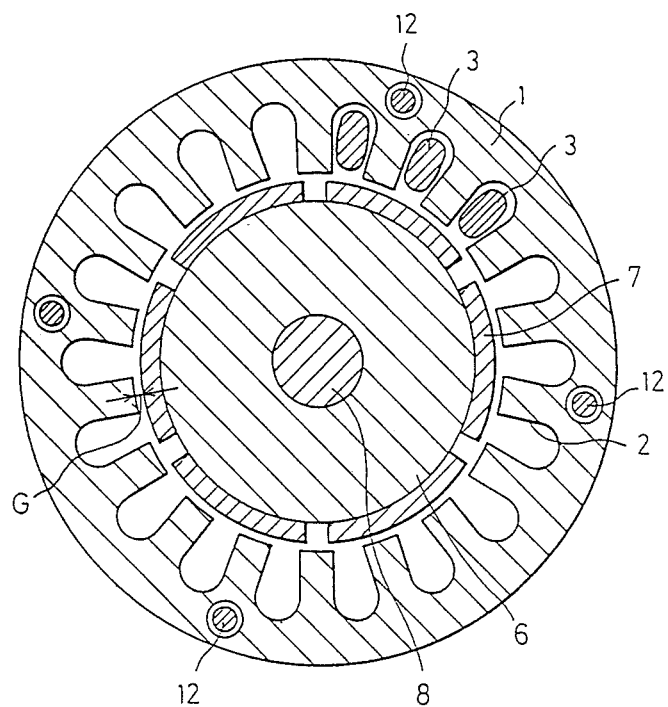
FIG. 5B is a view showing the section taken along the line B—B in FIG. 5A.
Figure 6A:
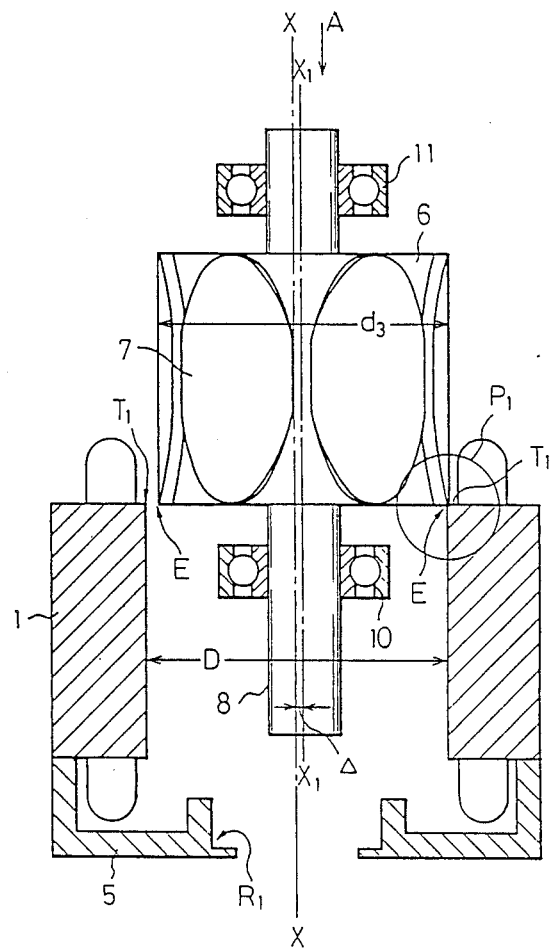
FIGS. 6A and 6B are diagrams illustrating the conventional method for insertion of a rotor.
Figure 6B:
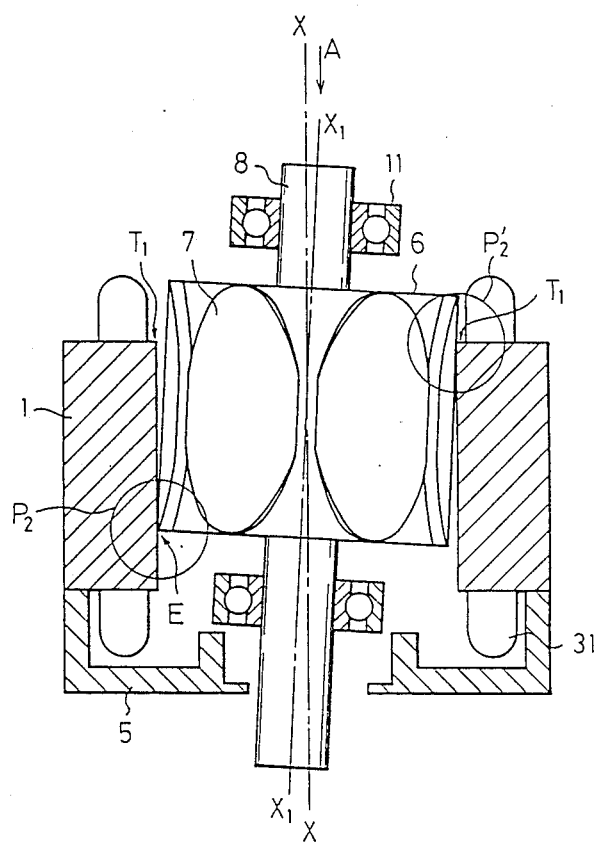

As shown in FIGS. 4A and 4B, a guide tool 40 of a non-magnetic material having an inclined guide face F having an inner circumferential face height $l_1$ and a cylindrical guide face having an inner diameter $D_2$ are supported on a supporting recess $R_2$ formed on the end face of a rear bracket 401, and a guide tool 90 having the same shape as that of the bearing holder 9 shown in Embodiment 1 is fitted to a rear bearing 11. In this state, a rotor is inserted into a stator. The procedures are the same as described in Embodiment 1, except that the above-mentioned tools are used as guide members.

The same effect as attained in Embodiment 1 is attained as the method for inserting the rotor.

After the rotor is completely inserted in the stator, the tools 40 and 90 are taken out and as shown in FIG. 4B, a bearing holder 92 having a bearing-supporting recess $R_1$ at the center is fitted to the rear bearing of the rotor and the peripheral edge of the holder is fitted to a supporting recess $R_2$ of a rear bracket 401. Then, the holder 92 is clamped to the bracket 401 by means of bolts 13 to complete the insertion and assembling of the rotor.

In the present embodiment, since tools having a high precision, that can be used repeatedly, have been adopted as guide members for which a high precision is required, the rotor can be easily inserted into the stator at a high efficiency without any damage to the magnet, as in the first embodiment, and the electric motor can be manufactured at a low cost.

While the invention has been particularly shown and described in reference to preferred embodiments thereof, it will be understood by those skilled in the art that changes in form and details may be made therein without departing from the spirit and scope of the invention.

We claim:

1. A method for inserting a rotor, having a rotor shaft, of an electric motor into a stator from a first end portion to a second end portion of said stator, comprising the steps of:

centering and guiding a first end portion of said rotor by a first guide tool having an inclined face which is in turn attached to said first end portion of said stator cooperating with a second guide tool attached to a rear end portion of said rotor shaft during initial insertion of said rotor into said stator, said rotor having a magnet which is easily chipped and being arranged on a peripheral face of said rotor to thereby prevent said first end portion of said rotor from being damaged by said first end portion of said stator;

guiding a second end portion of said rotor within said stator by guiding a front end portion of a rotor shaft by a front bearing attached to said second end portion of said stator, and by guiding a rear end portion of said rotor shaft by said first guide tool attached to said first end portion of said stator cooperating with said second guide tool attached to a rear end portion of said rotor to thereby prevent said first end portion of said rotor from being damaged by the inner surface of said stator and to thereby prevent said rotor peripheral face from being damaged by said first end portion of said stator; and removing said first and second guide tools from said first end portion of the stator and said rear end portion of the rotor shaft, respectively.

2. The method according to claim 1, wherein said steps of centering and guiding said first end portion of said rotor is by a first guide member made of non-magnetic material.

* * * * *